(12) United States Patent
Botz

(10) Patent No.: US 7,350,079 B2
(45) Date of Patent: Mar. 25, 2008

(54) APPARATUS AND METHOD FOR INTER-PROGRAM AUTHENTICATION USING DYNAMICALLY-GENERATED PUBLIC/PRIVATE KEY PAIRS

(75) Inventor: Patrick S. Botz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 10/717,749

(22) Filed: Nov. 20, 2003

(65) Prior Publication Data

US 2005/0125668 A1    Jun. 9, 2005

(51) Int. Cl.
*G06F 9/00* (2006.01)
(52) U.S. Cl. .................. 713/182; 713/168; 713/169
(58) Field of Classification Search ............... 713/182, 713/168, 169
See application file for complete search history.

(56) References Cited

OTHER PUBLICATIONS

U.S. Appl. No. 09/818,064, "Apparatus and Method for Managing Multiple User Identities on a Networked Computer System", Botz, et al., filed Mar. 27, 2001.

*Primary Examiner*—Thomas R. Peeso
(74) *Attorney, Agent, or Firm*—Martin & Associates, LLC; Derek P. Martin

(57) ABSTRACT

In a multi-tiered computing environment, a first program may authenticate with a second program using dynamically-generated public/private key pairs. An authentication token is constructed that includes user information and information about the first program and the second program. The first program then digitally signs the authentication token using the dynamically-generated private key, and sends the authentication token to the second program. The second program then verifies the authentication token using the public key corresponding to the first program. Once verified, the first program is authenticated to the second program. The second program may then authenticate to a next-tier program by constructing an authentication token that includes the information in the authentication token received from the first program. This may continue to any suitable number of tiers, using dynamically-generated public/private key pairs to allow authentication between programs without requiring any user interaction or input from a system administrator.

57 Claims, 13 Drawing Sheets

| | | | | | | AT5 |
|---|---|---|---|---|---|---|
| Signature of TTP | TM3 | Signature of STP | TM2 | Signature of FTP | TM1 | UT |

FIG. 17

| | | | | | | | | | ATN |
|---|---|---|---|---|---|---|---|---|---|
| Signature of NTP | TMN | ∘∘∘ | Signature of TTP | TM3 | Signature of STP | TM2 | Signature of FTP | TM1 | UT |

FIG. 18

| | | | | | AT3' |
|---|---|---|---|---|---|
| Signature of PKA | Signature of STP | TM2 | Signature of FTP | TM1 | UT |

FIG. 19

| | | | | | | | AT5' |
|---|---|---|---|---|---|---|---|
| Signature of PKA | Signature of TTP | TM3 | Signature of STP | TM2 | Signature of FTP | TM1 | UT |

FIG. 20

APPARATUS AND METHOD FOR INTER-PROGRAM AUTHENTICATION USING DYNAMICALLY-GENERATED PUBLIC/PRIVATE KEY PAIRS

BACKGROUND OF THE INVENTION

1. Technical Field

This invention generally relates to computer systems, and more specifically relates to apparatus and methods for authenticating between computer programs.

2. Background Art

The widespread proliferation of computers in our modern society has prompted the development of computer networks that allow computers to communicate with each other. With the introduction of the personal computer (PC), computing became accessible to large numbers of people. Networks for personal computers were developed that allow individual users to communicate with each other. In this manner, a large number of computers may communicate with other computers on the network.

Many modern computing environments include a heterogeneous mix of programs that interact with each other to perform a wide variety of tasks. In fact, there may be multiple levels or tiers of programs. For example, a user may authentication to a first-tier program by entering a user ID and password. A program is a first-tier program when a user directly authenticates with it. Once the user is authenticated to the first-tier program, the user may request a service that is provided by a second-tier program that is accessed by the first-tier program. As a result, there must be some way for the user to authenticate with the second-tier program. Requiring the user to enter a user ID and password each time the user invokes a function or service provided by a next-tier program would become very annoying to the user.

Note that programs are not inherently first-tier, second-tier, etc. The tier level of the program depends on who invoked it and when it is invoked. To be a first-tier program, a program must have the ability to authenticate a user, such as by receiving a user ID and password from the user. To be a next-tier program, the program may receive a request from another program to perform some function that requires authentication. Thus, a program could be a first-tier program at one point in time when a user requests a service directly from the program, and may be a third-tier program at another time when a user authenticates directly with a first-tier program, which authenticates to a second-tier program, which authenticates with this program to perform some service or function.

A very simple multi-tiered system 200 as known in the art is shown in FIG. 2. A user 210 authenticates to a first-tier program 124A, typically be entering a user ID and password. When the user makes a request to the first-tier program 124A that requires the second-tier program 124B to perform a service or function, the user must be authenticated to the second-tier program 124B. There are many known ways for the user to authenticate to the second-tier program 124B, many of which are discussed in detail below. Once the user has authenticated to the second-tier program 124B, the next-tier program may perform the requested service or function for the user.

The known methods for a first-tier program to authenticate to a next-tier program all require secure passwords to be stored somewhere. Storing secure passwords adds significant overhead in administrating a computer network. Not only must the passwords be stored in a secure manner and location, they must also be periodically changed. For this reason, known authentication techniques that use secure passwords do not provide a desirable solution for multi-tiered computing environments. Without a way for one computer program to authenticate a user to another computer program without using secure keys that must be stored, shared and maintained over time, the computer industry will continue to suffer from inefficient ways of inter-program authentication in multi-tiered computing environments.

DISCLOSURE OF INVENTION

In a multi-tiered computing environment, a first program may authenticate with a second program using dynamically-generated public/private key pairs. An authentication token is constructed that includes user information and information about the first program and the second program. The first program then digitally signs the authentication token using the dynamically-generated private key, and sends the authentication token to the second program. The second program then verifies the authentication token by querying a public key authority for the public key corresponding to the first program. Once verified, the first program is authenticated to the second program. The first-tier program then asserts the identity of the user to the second-tier program. The second program may then authenticate to a next-tier program by constructing an authentication token that includes the information in the authentication token received from the first program. This may continue to any suitable number of tiers, using dynamically-generated public/private key pairs to construct authentication tokens that allow authentication between programs without requiring any user interaction or input from a system administrator.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 17 shows an authentication token constructed by the third-tier program to authenticate to a fourth-tier program;

FIG. 18 shows an authentication token constructed by an Nth-tier program to authenticate with an (N+1)th-tier program;

FIG. 19 shows an authentication token returned by the public key authority when the authentication token AT3 in FIG. 15 is passed to the public key authority for verification;

FIG. 20 shows an authentication token returned by the public key authority when the authentication token AT5 in FIG. 17 is passed to the public key authority for verification;

BEST MODE FOR CARRYING OUT THE INVENTION 1.0 Overview

The present invention is directed to authentication between programs in a multi-tiered heterogenous computing environment. A discussion below presents the current state of the art to allow a proper understanding of the significance of the preferred embodiments.

Figure 2:
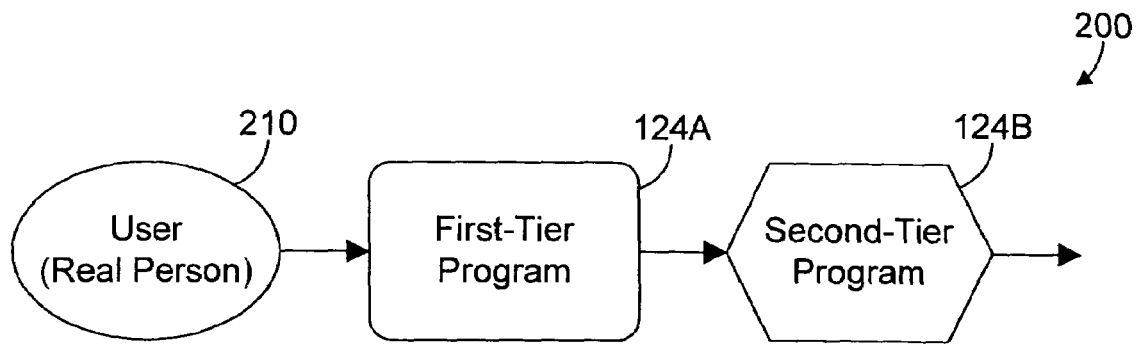
FIG. 2 is a diagram of a prior art multi-tiered computing environment.

Referring to FIG. 2, a simple 2-tier computing environment 200 is shown. A user 210 authenticates to the first-tier program 124A, and then requests of the first-tier program some action or function that is provided by the second-tier program 124B. As a result, the first-tier program 124A needs to authenticate to the second-tier program 124B on behalf of user 210. There are many ways known in the art for the first-tier program 124A to authenticate to the second-tier program 124B. Some of these are discussed below.

Figure 3:
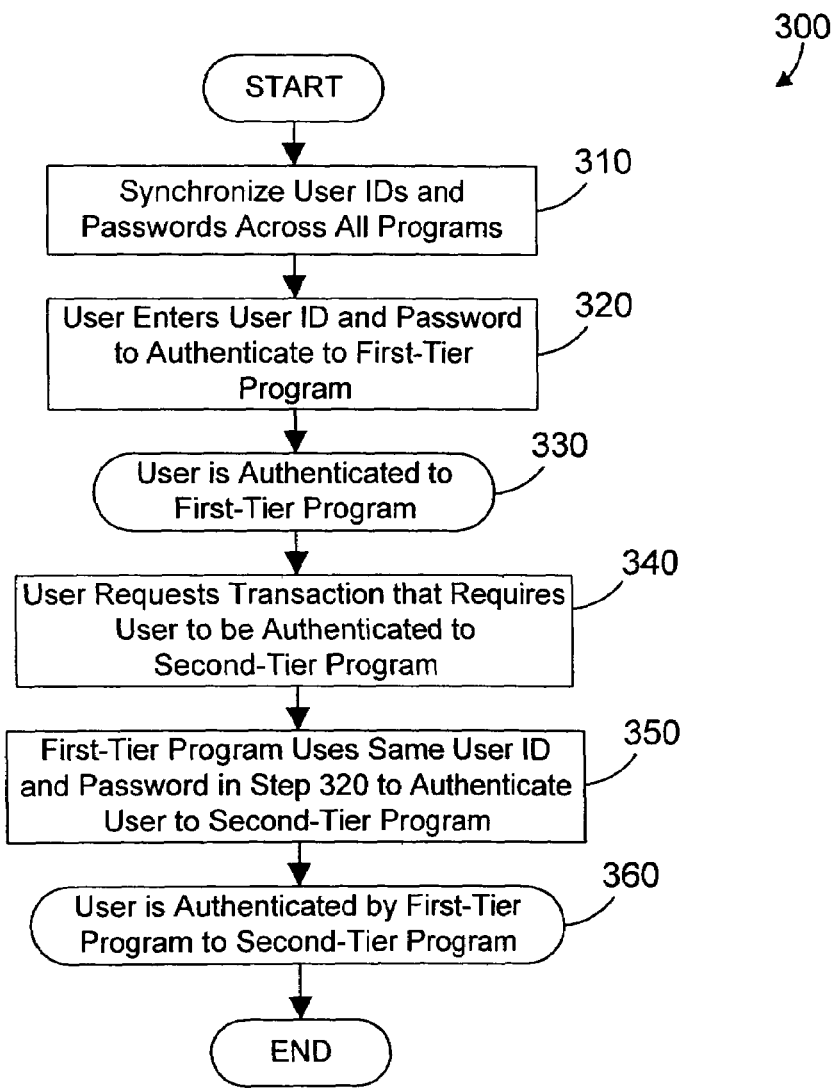
FIG. 3 is a flow diagram of a first prior art method for the computing environment in FIG. 2 that allows a user to authenticate with the first-tier program, and that allows the first-tier program to authenticate with the second-tier program.

Referring to FIG. 3, one prior art method 300 synchronizes user IDs and passwords across all programs, then uses the same user ID and password to authenticate to each program. The first step is to synchronize the user IDs and passwords across all programs (step 310). A user then enters his or her user ID and password to authenticate to the first-tier program (step 320). Assuming the user ID and password match the synchronized user ID and password for that user, the user is now authenticated to the first-tier program (step 330). Now the user requests a transaction that requires the user to be authenticated to the second-tier program (step 340). Because the user IDs and passwords have been synchronized across all programs, the first-tier program uses the same user ID and password it received from the user to authenticate to the second-tier program (step 350). Assuming a match, the user is then authenticated by the first-tier program to the second-tier program (step 360). The management of synchronized user IDs and passwords is difficult and expensive. In addition, some system administrator could use the wrong tool to change a password in one location without synchronizing it with the rest of the system, and can thus cause errors and problems in the system.

Figure 4:
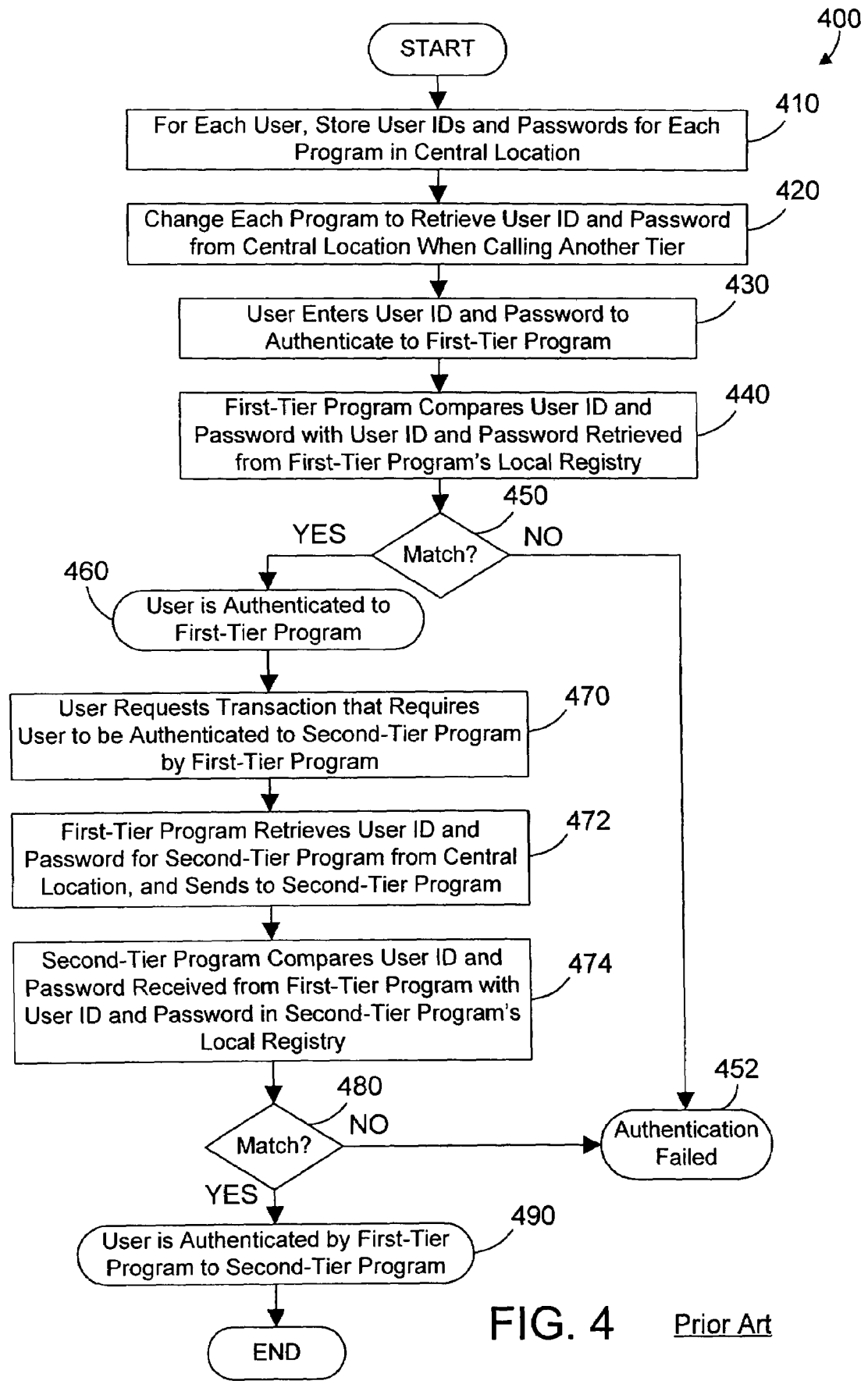
FIG. 4 is a flow diagram of a second prior art method for the computing environment in FIG. 2 that allows a user to authenticate with the first-tier program, and that allows the first-tier program to authenticate with the second-tier program.

Another prior art method for authenticating between programs is shown as method 400 in FIG. 4. First, the user IDs and passwords corresponding to a user for all programs are stored in a central location (step 410). Next, each program must be changed to retrieve the user ID and password information from the central location when the program calls another tier (step 420). At this point, a user may enter the user ID and password to authenticate to a first-tier program (step 430). The first-tier program retrieves the user ID and password for that user from its own local registry, and compares them with the user ID and password entered by the user (step 440). If the two do not match (step 450=NO), authentication failed (step 452). If the user ID and password match (step 450=YES), the user is authenticated to the first-tier program (step 460). The user then requests a transaction that requires the user to be authenticated to a second-tier program by the first-tier program (step 470). The first-tier program retrieves the required user ID and password for the second-tier program from the central location, and sends the user ID and password to the second-tier program (step 472). The second-tier program then compares the user ID and password received from the first-tier program with the user ID and password retrieved from the second-tier program's local registry (step 474). If these don't match (step 480=NO), authentication failed (step 452). If the user IDs and passwords match (step 480=YES), the user is authenticated by the first-tier program to the second-tier program (step 490). Method 400 suffers from some of the same drawbacks as method 300 in FIG. 3, that the management of user IDs and passwords is difficult and expensive. In addition, modifying each program to retrieve user ID and password information from the central location when authenticating to a different tier may be difficult or impossible, especially when using pre-packages programs from different vendors. Furthermore, having user IDs and passwords in a central location in a clear text or decryptable form presents a security concern for unauthorized individuals that may wish to access this information. Any administrator of any small portion of the computing environment could potentially learn anyone's password everywhere in the enterprise.

Figure 5:
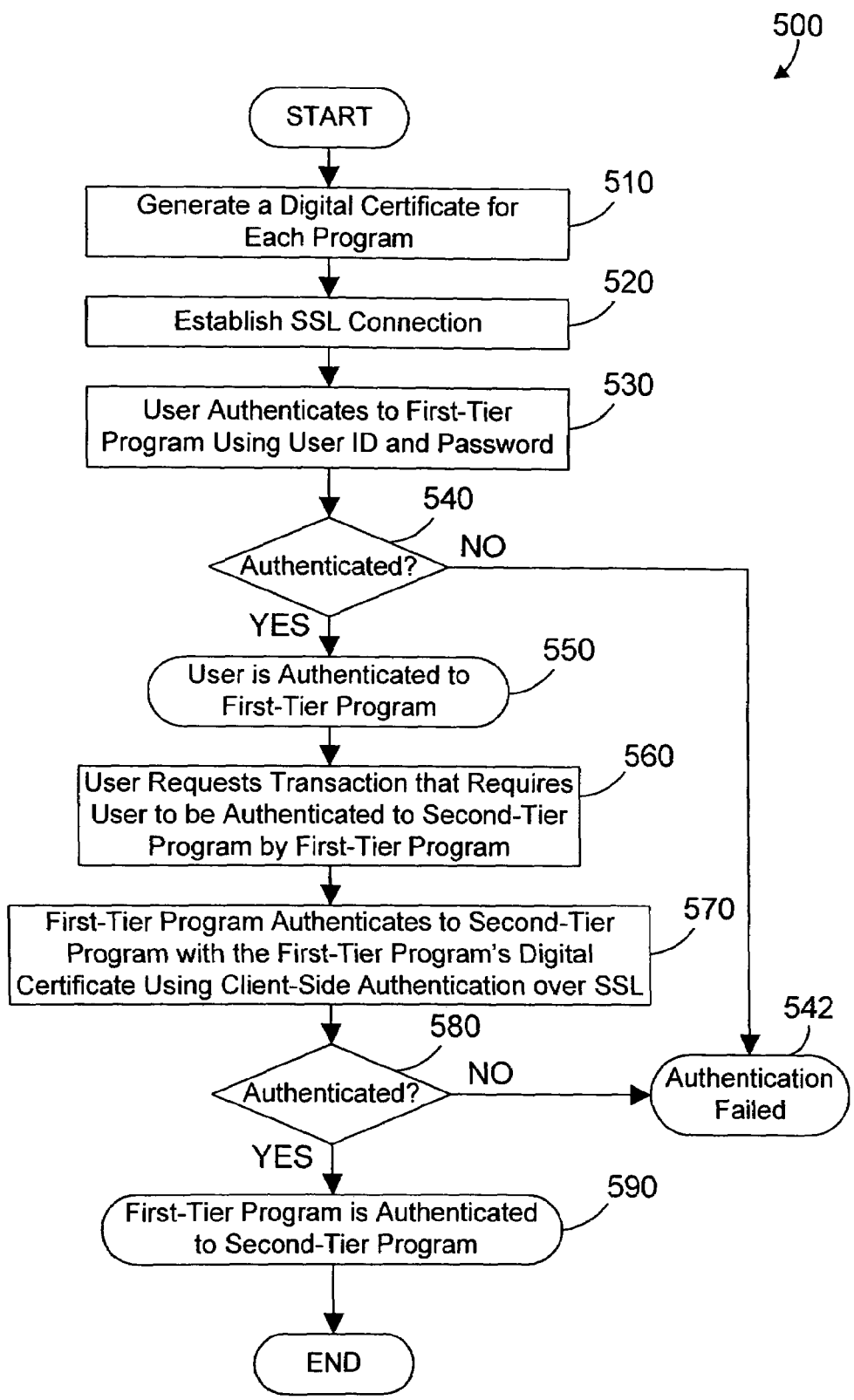
FIG. 5 is a flow diagram of a third prior art method for the computing environment in FIG. 2 that allows a user to authenticate with the first-tier program, and that allows the first-tier program to authenticate with the second-tier program.

Another way known in the art for one program to authenticate to another program uses digital certificates. Referring to FIG. 5, method 500 allows authentication between programs using digital certificates. First, a digital certificate must be generated for each program (step 510). A Secure Socket Layer (SSL) connection is then established (step 520). A user then authenticates to the first-tier program using a user ID and password (step 530). If the user is not authenticated (step 540=NO), authentication failed (step 542). If the user is authenticated (step 540=YES), the user is authenticated to the first-tier program (step 550). The user then requests a transaction that requires the user to be authenticated to a second-tier program by the first-tier program (step 560). The first-tier program then authenticates to the second-tier program with the first-tier program's digital certificate using client-side authentication over SSL (step 570). If the first-tier program is not authenticated (step 580=NO), authentication failed (step 542). If the first-tier program is authenticated (step 580=YES), the first-tier program has successfully authenticated to the second-tier program (step 590). Now that the first-tier program is trusted by the second-tier program, the first-tier program may assert the identity of the end user to the second-tier program. The main problem with using digital certificates is they have proven to be cumbersome and expensive to manage over time. Sometimes a certificate is not present, and the process of acquiring a certificate adds to the overhead of the system. Finally, the private key associated with a client digital certificate used for client authentication is also hard to store securely on a multiuser machine over a long period of time.

The preferred embodiments discussed below overcome the drawbacks in the prior art discussed above by providing inter-program authentication using dynamically-generated public/private key pairs, thereby eliminating the need to manage static authentication information over long periods of time.

2.0 Description of the Preferred Embodiments

The present invention provides a way for computer programs to authenticate with each other using dynamically-generated public/private key pairs. This approach eliminates the administrative overhead associated with storing, sharing and maintaining different symmetric keys. Because the dynamically-generate key pairs are short-lived, they don't have to be stored securely or maintained over time. Because the dynamically-generated key pairs are public/private key pairs, they don't have to be pre-shared. In addition, because the key pairs are dynamically generated, they are created without any input required from a user or system administrator. The present invention also provides a tracking mechanism that constructs a log of which programs accessed other programs, as explained in more detail below.

Figure 1:
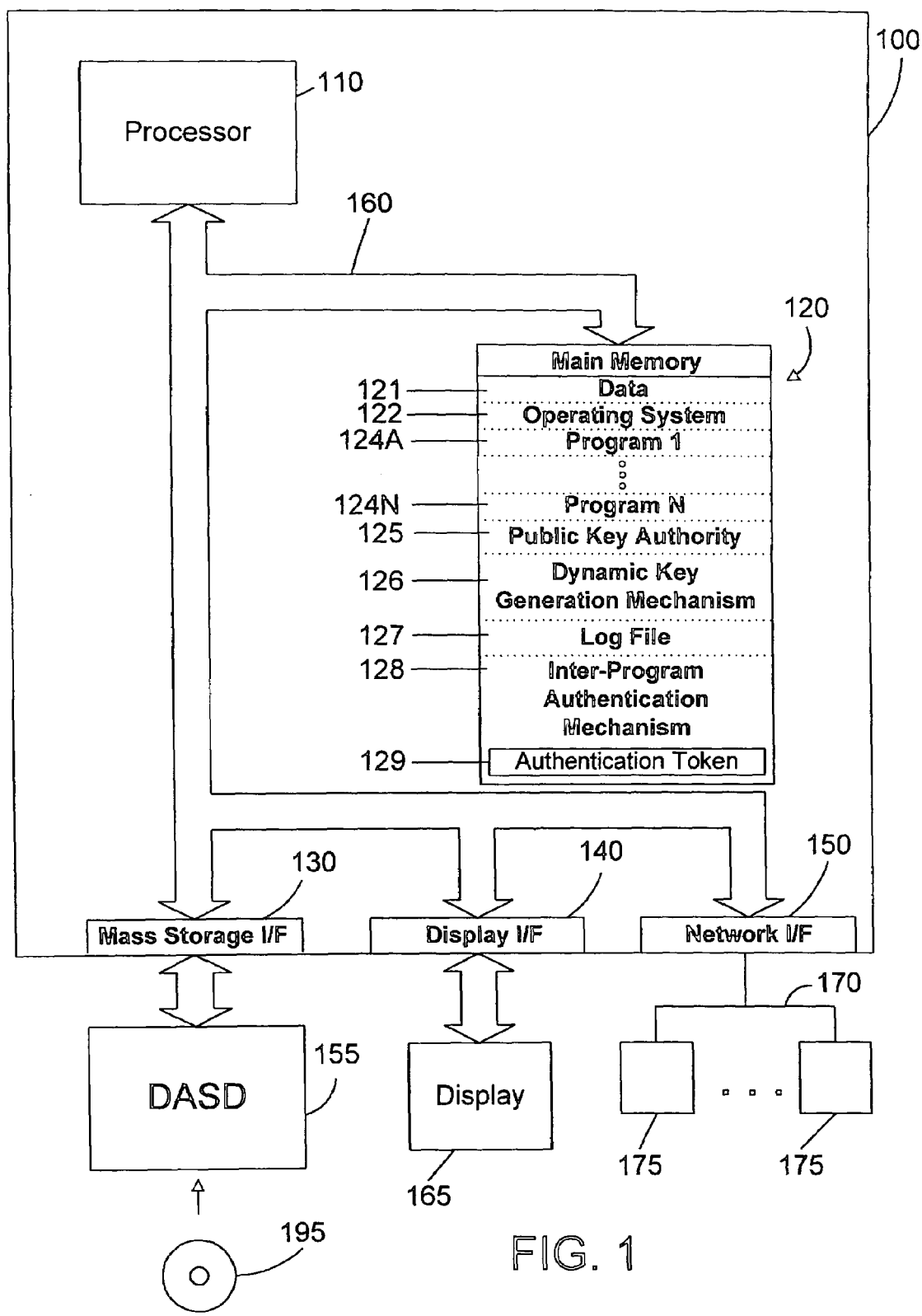
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, programs 124 (shown as 124A . . . 124N in FIG. 1), a public key authority 125, a dynamic key generation mechanism 126, a log file 127, and an inter-program authentication mechanism 128. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Programs 124 represent any suitable program in a computer system. Note, however, that the present invention has particular applicability in a computer system that includes multiple tiers of computer programs that need to communicate (and therefore authenticate) with each other. FIG. 2 shows a prior art computing environment 200 that includes multiple tiers of programs. A user is represented by 210. The user authenticates with a first-tier program 124A, and makes a request that requires the first-tier program 124A to interact with the second-tier program 124B. When the second-tier program 124B performs the desired function, it returns information to the first-tier program 124A, which in turn returns information to the user 210. FIG. 2 is the most basic representation of a computing environment 200 that include multiple tiers. Of course, a more complex computing environment could include more than two tiers of computer programs.

Referring back to FIG. 1, the public key authority 125 is a mechanism that publishes public keys to programs that request access to the public keys of other programs. Public/private key pairs are common and known in the art. The dynamic key generation mechanism 126 dynamically generates public/private key pairs that are associated with a "trusted" program. A trusted program is one to which an administrator assigns a program identifier, one to which an administrator gives permission to publish public keys, and one that can prove to the public key authority 125 that it is a trusted program. The dynamic key generation mechanism 126 creates a public/private key pair for a particular program, then sends the public key to the public key authority 125 for publication to other trusted programs. The program that contains the private key uses the private key to encrypt data sent to other programs, which can verify that the encrypted data came from the program by requesting the program's public key from the public key authority and using the public key to decrypt the data. The public key authority 125 can also return a user ID to a trusted program that represents the end user in the program's user registry context. Log file 127 allows tracking all tiers involved in a single request made by a user, thereby providing a historical record of an entire transaction from the end user to the last-tier program.

Inter-program authentication mechanism 128 performs authentication between programs 124 in a unique way that utilizes key pairs dynamically generated by the dynamic key generation mechanism 126. The inter-program authentication mechanism 128 generates an authentication token 129 which is signed using a private key generated by the dynamic key generation mechanism 126. The authentication token 129 may then be used by one program to authenticate with a different program, as discussed in more detail below with respect to FIGS. 6-23.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, programs 124, public key authority 125, dynamic key generation mechanism 126, log file 127, and inter-program authentication mechanism 128 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links.

Figure 6:
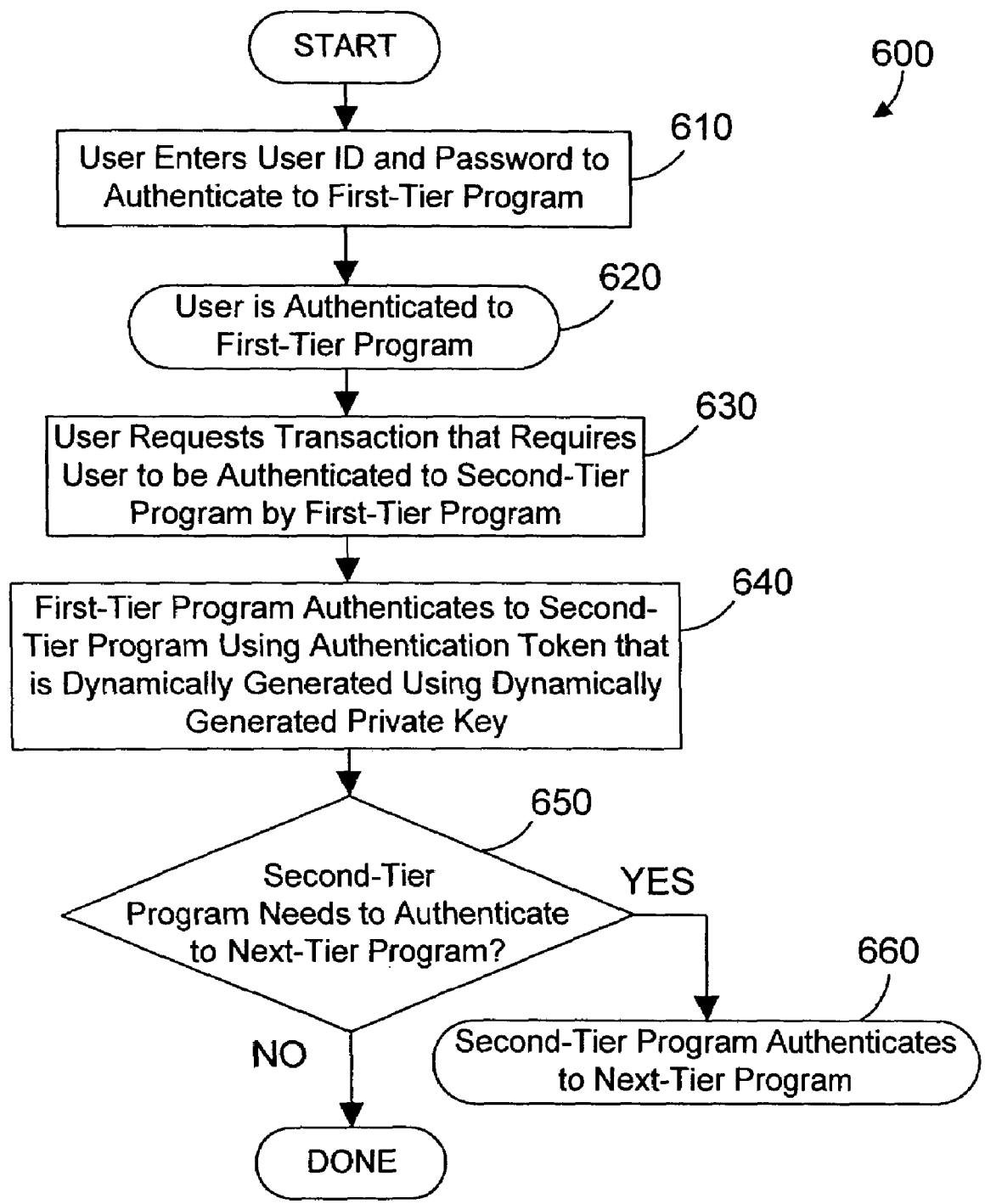
FIG. 6 is a flow diagram of a method in accordance with the preferred embodiments for the computing environment of FIG. 2 that allows a user to authenticate with the first-tier program, and that allows the first-tier program to authenticate with the second-tier program using dynamically-generated public/private key pairs.

Referring now to FIG. 6, a method 600 in accordance with the preferred embodiments begins by a user entering a user ID and password to authenticate to a first-tier program (step 610). Assuming the user enters the proper information, the user is authenticated to the first-tier program (step 620). The user then requests a transaction that requires the user to be authenticated to a second-tier program by the first-tier program (step 630). In response, the first-tier program authenticates to the second-tier program using an authentication token that is dynamically generated using a private key from a dynamically generated key pair (step 640). If the second-tier program does not need to authenticate to a next-tier program (step 650=NO), method 600 is done. If the second-tier program needs to authenticate to a next-tier program (step 650=YES), the second-tier program authenticates to the next-tier program (step 660). One skilled in the art will realize that in the preferred embodiments, method 600 may extend to any suitable number of tiers, with each tier authenticating to the next tier using dynamically generated key pairs. Note that steps 640 and 660 in FIG. 6 are preferably performed by the inter-program authentication mechanism 128 in FIG. 1.

Figure 7:
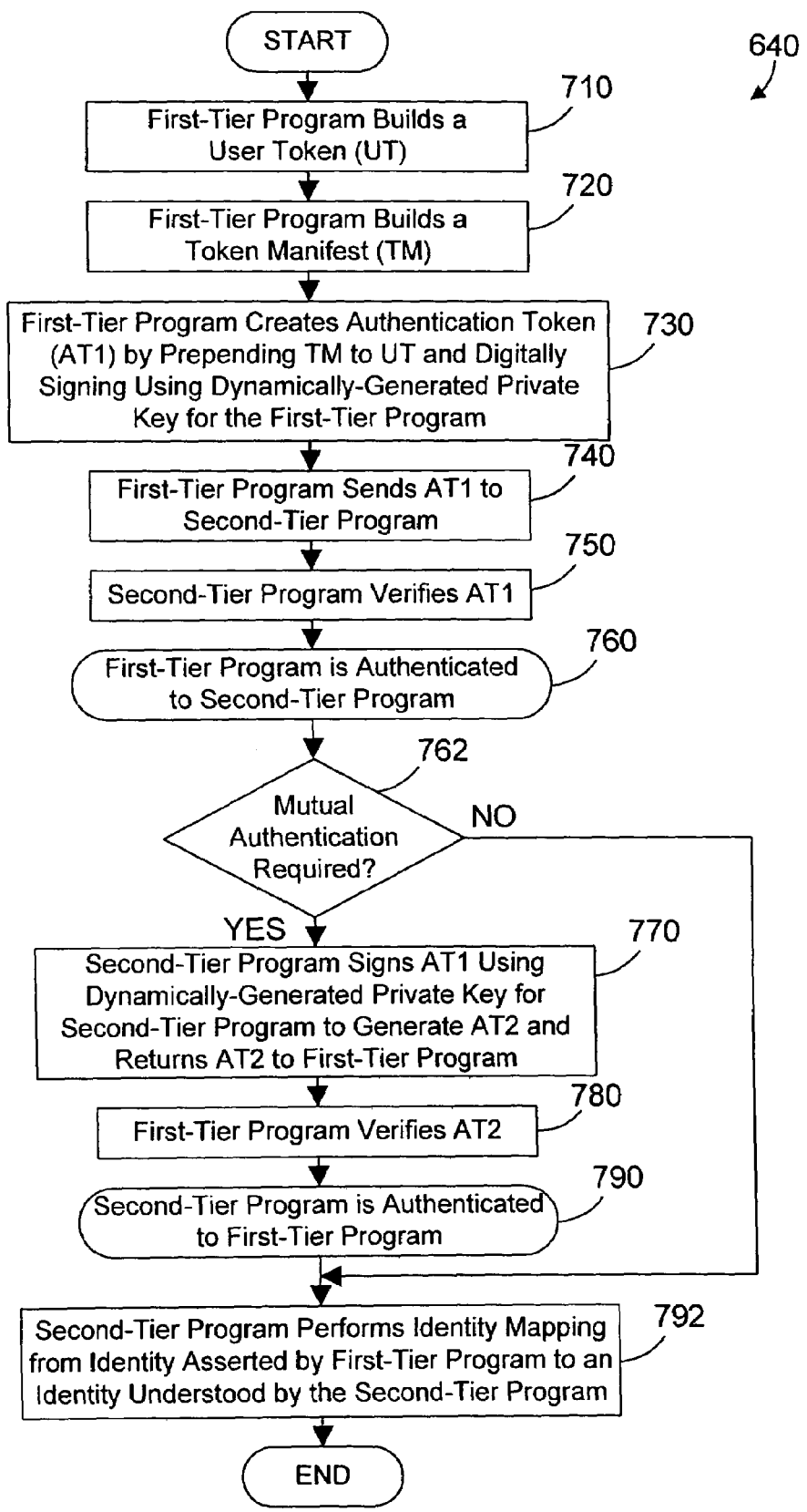
FIG. 7 is a flow diagram showing one suitable implementation of step 640 in FIG. 6 in accordance with the preferred embodiments.

One suitable implementation for step 640 in FIG. 6 in accordance with the preferred embodiments is shown in FIG. 7. When a first-tier program needs to authenticate to a second-tier program, the first-tier program first builds a user token UT (step 710). The user token preferably includes information about the user. The first-tier program then builds a token manifest TM (step 720). A token manifest preferably includes information about the first-tier program and information about the second-tier program. The first-tier program then creates an authentication token AT1 by prepending the token manifest to the user token, and the result is digitally signed using the dynamically-generated private key for the first-tier program, and the digital signature is then prepended to the authentication token (step 730). The first-tier program then sends the authentication token AT1 to the second-tier program (step 740). The second-tier program verifies the authentication token AT1 received from the first-tier program (step 750). Because the authentication token AT1 includes the identity of the user in the context of the first-tier program's user registry, the authentication token AT1 asserts the identity of the end-user to the second-tier program. The verification in step 750 is preferably performed by the second-tier program querying a public key authority that published the public key of the first-tier program that was used to sign the authentication token, and by using the returned public key for the first-tier program to determine whether the authentication token is valid for the first-tier program. If so, the first-tier program is authenticated to the second-tier program (step 760). If mutual authentication is required (step 762=YES), the second-tier program signs the authentication token it received from the first-tier program using a dynamically-generated key for the second-tier program to generate a new authentication token AT2, and returns this new authentication token to the first-tier program (step 770). The first-tier program then verifies the authentication token AT2 received from the second-tier program (step 780), preferably by querying the public key authority for the public key for the second-tier program, which is used to determine whether the authentication token AT2 is valid for the second-tier program. Assuming the authentication token AT2 is verified in step 780, the second-tier program is authenticated to the first-tier program (step 790). Once the second-tier program is authenticated to the first-tier program in step 790, the second-tier program performs an identity mapping from the identity asserted by the first-tier program to an identity understood by the second-tier program (step 792). Note also that if mutual authentication is not required (step 762=NO), the second-tier program also performs the identity mapping in step 792.

Figure 8:
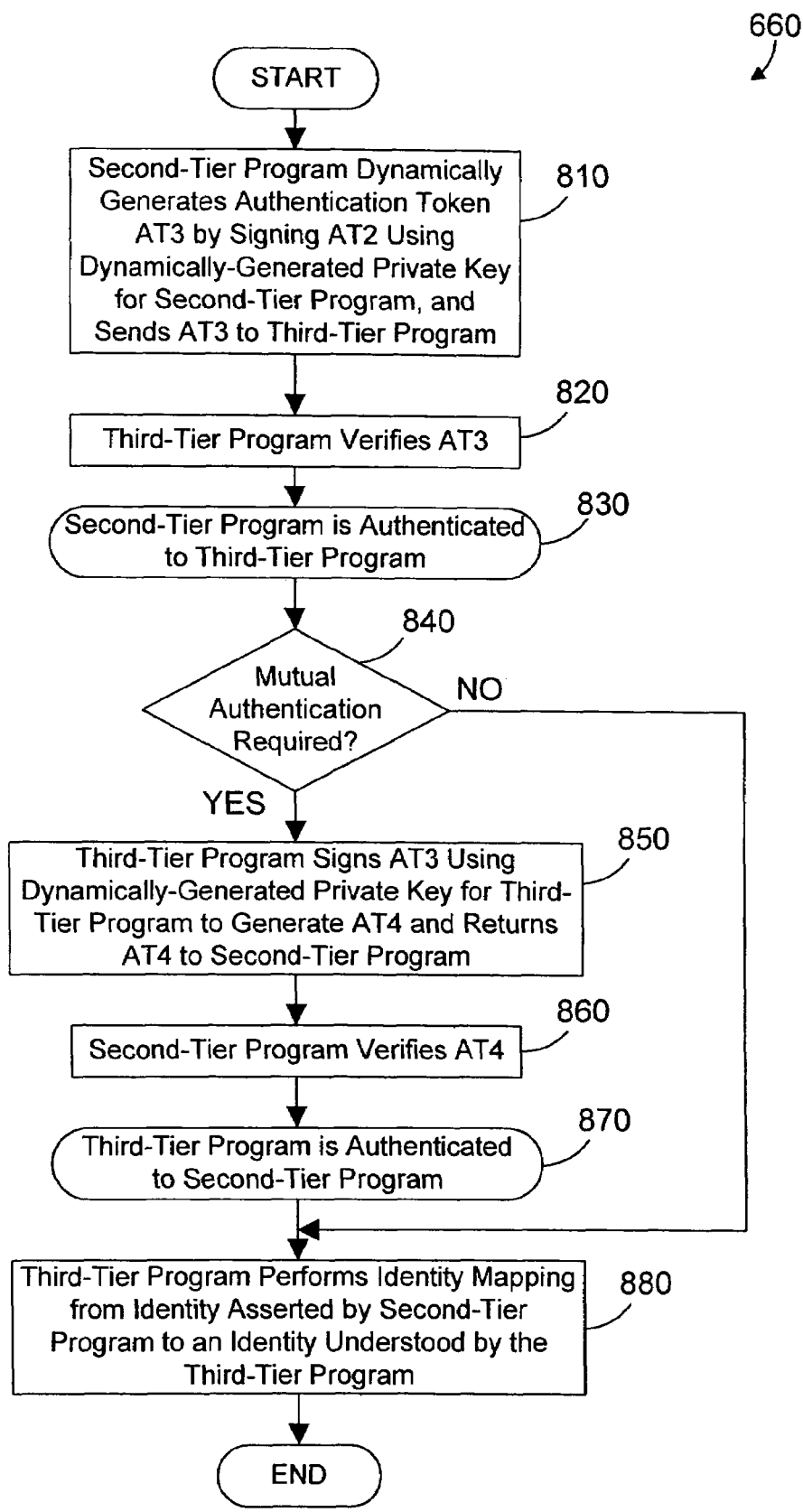
FIG. 8 is a flow diagram showing one suitable implementation of step 660 in FIG. 6 in accordance with the preferred embodiments.

One suitable implementation for step 660 in FIG. 6 in accordance with the preferred embodiments is shown in FIG. 8. Step 660 is performed in FIG. 6 when a second-tier program needs to authenticate to a next-tier program (step 650=YES), so we assume the steps shown in FIG. 7 have already been performed to authenticate the first-tier program to the second-tier program in step 640. We now assume that the user makes a request for a transaction that requires the second-tier program to authenticate to a third-tier program. At this point, the steps in FIG. 8 are performed. The second-tier program dynamically generates an authentication token AT3 by signing AT2 using the dynamically-generated private key for the second-tier program, and sends AT3 to a third-tier program (step 810). The third-tier program then verifies the authentication token AT3 received from the second-tier program (step 820), preferably by querying the public key authority for the public key for the second-tier program, which is used to determine whether the authentication token AT3 is valid for the second-tier program. Assuming the authentication token AT3 is verified in step 820, the second-tier program is authenticated to the third-tier program (step 830). If mutual authentication is required between the second-tier and third-tier programs (step 840=YES), the third-tier program signs the authentication token AT3 using the dynamically-generated private key for the third-tier program to generate a new authentication token AT4, which is returned to the second-tier program (step 850). The second-tier program then verifies the authentication token AT4 received from the third-tier program (step 860), preferably by querying the public key authority for the public key for the third-tier program, which is used to determine whether the authentication token AT4 is valid for the third-tier program. Assuming the authentication token AT4 is verified in step 860, the third-tier program is authenticated to the second-tier program (step 870). Once the third-tier program is authenticated to the second-tier program in step 870, the third-tier program performs an identity mapping from the identity asserted by the second-tier program to an identity understood by the third-tier program (step 880). Note also that if mutual authentication is not required (step 840=NO), the second-tier program also performs the identity mapping in step 880.

Figure 9:
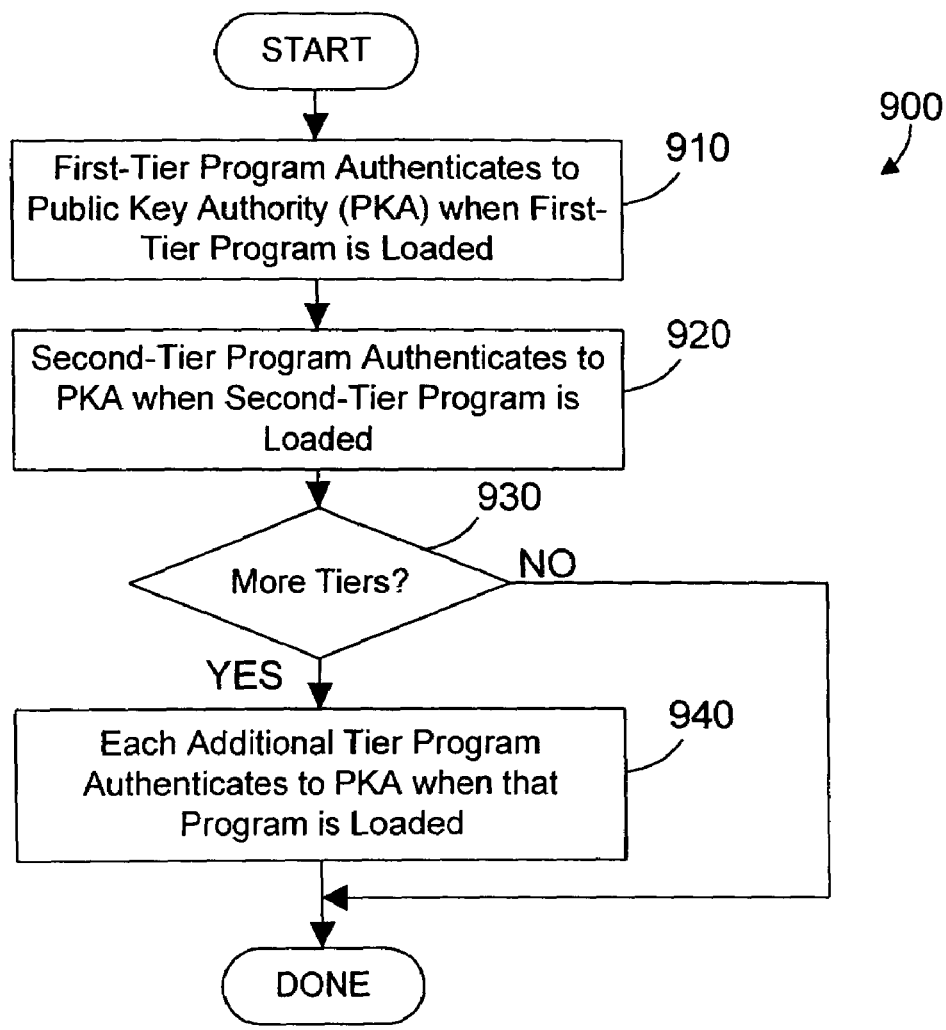
FIG. 9 is a flow diagram of a method in accordance with the preferred embodiments for each program to authenticate with the public key authority when each program is loaded.

Referring now to FIG. 9, a method 900 in accordance with the preferred embodiments shows steps for each program to authenticate to the public key authority. The first-tier program authenticates to the public key authority when it is initially loaded (step 910). In similar fashion, the second-tier program authenticates to the public key authority when it is initially loaded (step 920). If there are more tiers (step 930=YES), each additional-tier program authenticates to the public key authority when that program is loaded (step 940). The programs may authenticate to the public key authority using any suitable scheme. For example, each program may have a secure user ID and password that it uses to authenticate to the public key authority, and once authenticated, it keeps a connection to the public key authority open and can query the public key authority as needed to receive public keys that are needed to verify authentication tokens.

Figure 10:
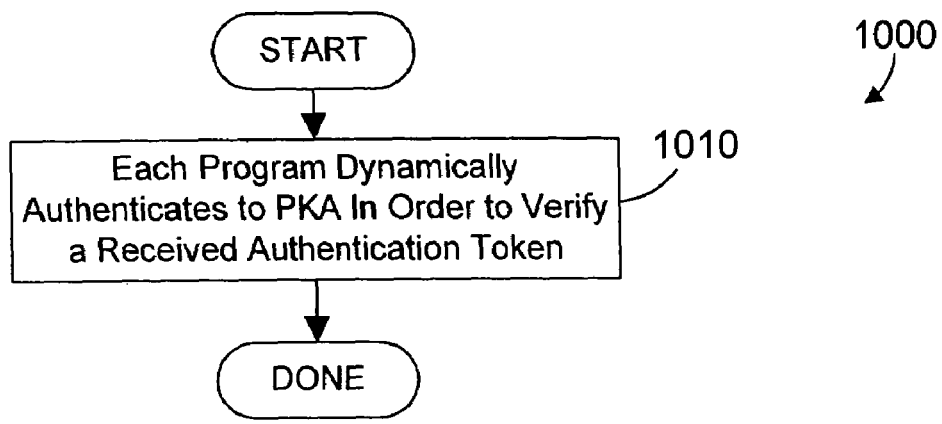
FIG. 10 is a flow diagram of a method in accordance with the preferred embodiments for each program to dynamically authenticate with the public key authority in order to verify a received authentication token.

An alternative to the authentication of programs to the public key authority when they are first loaded is shown in method 1000 in FIG. 10, in which each program dynamically authenticates to the public key authority in order to verify a received authentication token (step 1010). While this dynamic authentication with the public key authority adds to the run-time overhead of the system, it also allows eliminates the need for any secure authentication information because each program can authenticate with the public key authority dynamically using their dynamically-generated public/private key pairs and received authentication tokens. Thus, the additional run-time overhead associated with the dynamic authentication with the public key authority in step 1010 may be preferable to a system that requires storing and maintaining secure keys that would be used in method 900 of FIG. 9.

Figure 11:
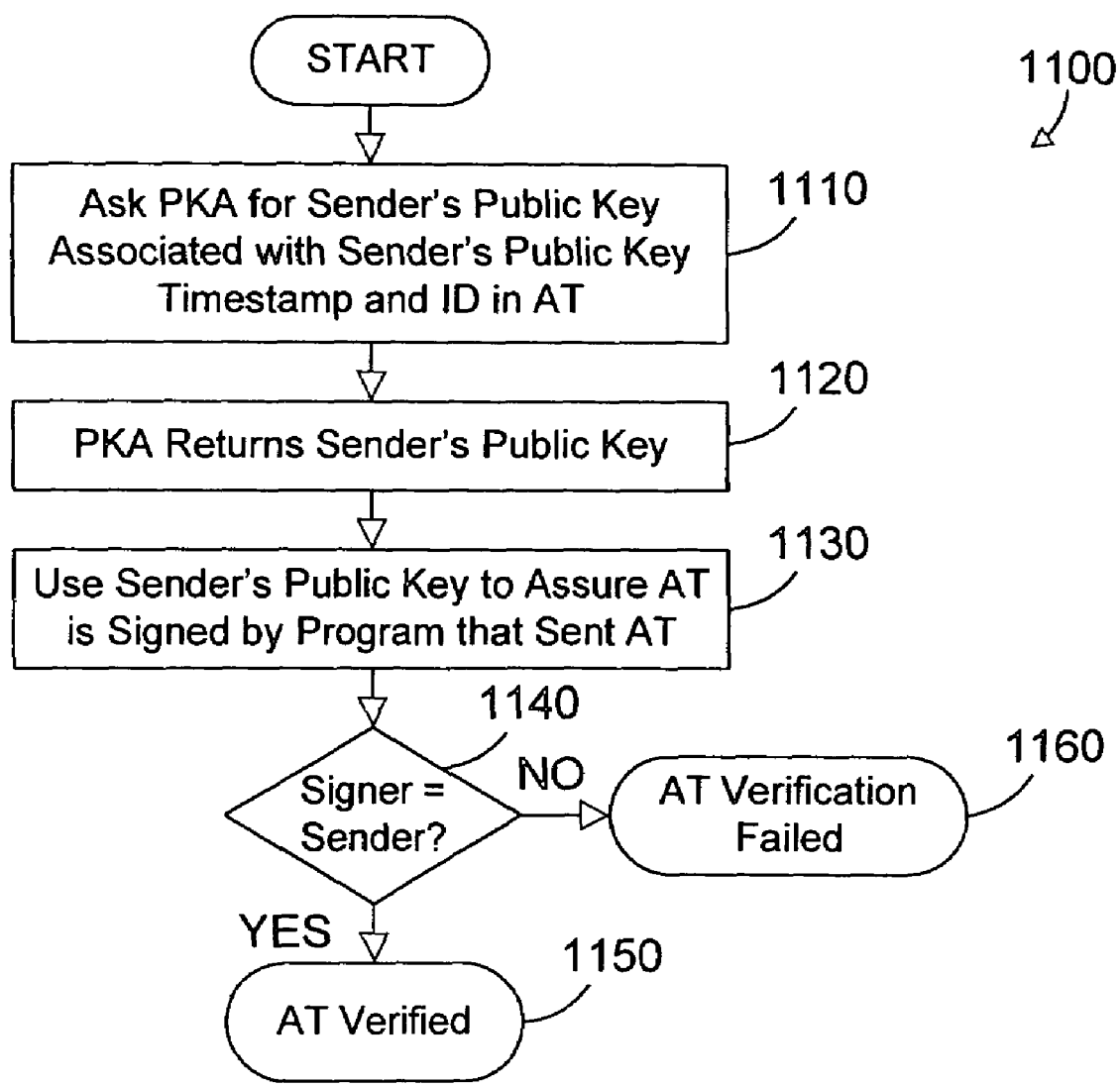
FIG. 11 is a flow diagram of a method in accordance with the preferred embodiments for verifying an authentication token received from another program.

Referring to FIG. 11, a method 1100 in accordance with the preferred embodiments shows the steps performed in verifying an authentication token. Thus, method 1100 could be performed during steps 750 and 780 in FIG. 7, and during steps 820 and 860 in FIG. 8. First, the program querying the public key authority requests the public key for the program that sent the authentication token (step 1110). The public key authority then returns the sender's public key (step 1120). The sender's public key may then be used by the program that received the authentication token to assure that the authentication token is signed by the program that sent the authentication token (step 1130). If the signer of the authentication token and the sender of the authentication token are the same (step 1140=YES), the authentication token is verified (step 1150). If the signer of the authentication token and the sender of the authentication token are not the same (step 1140=NO), verification of the authentication token failed (step 1160).

Figure 12:
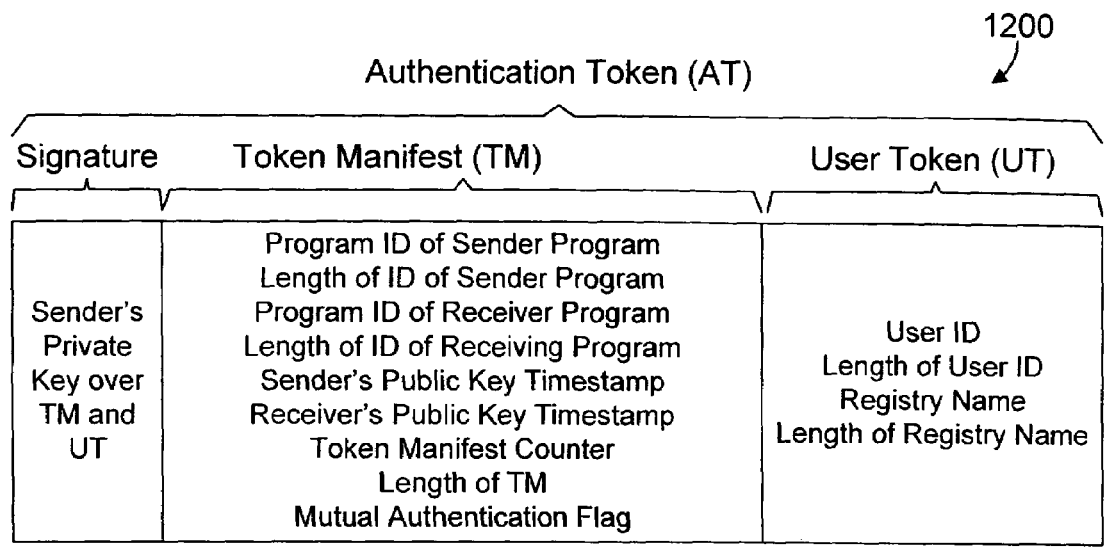
FIG. 12 is a diagram showing one suitable implementation of an authentication token in accordance with the preferred embodiments.

An example is now presented to illustrate the concepts discussed above with respect to the methods in FIGS. 6-11. Referring to FIG. 12, one suitable implementation of an authentication token 1200 is shown, which includes a user token UT, a token manifest TM, and a signature over the appended TM and UT using the dynamically-generated key corresponding to the sender. The user token UT suitably includes information relating to the user. One example of suitable user information is shown in FIG. 12 to include a user ID, a length of the user ID, a registry name, and a length of the registry name. Of course, other information could be included in the user token UT as well within the scope of the preferred embodiments.

The token manifest TM suitably includes information relating to the sender of the authentication token and the receiver of the authentication token. One example of suitable information stored in the token manifest is shown in FIG. 12 to include a program ID of the sender program, a length of ID for the sender program, a program ID for the receiver program, a length of ID for the receiver program, the sender's public key timestamp, the receiver's public key timestamp, a token manifest counter, a length of the token manifest, and a mutual authentication flag. The token manifest counter counts the levels of tiers, and provides useful information when writing information to the log file (see 127 in FIG. 1). The mutual authentication flag, when set, requires mutual authentication between tiers (e.g., YES in step 762 in FIG. 7 and YES in step 840 in FIG. 8). The token manifest TM is prepended to the user token UT, and the sender then digitally signs the result using the sender's private key that was dynamically generated and assigned to the sender.

Figure 13:
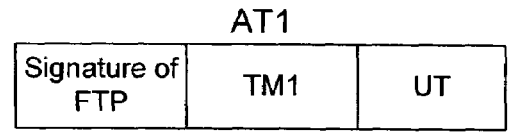
FIG. 13 shows an authentication token constructed by a first tier program to authenticate to a second-tier program.
Figure 14:
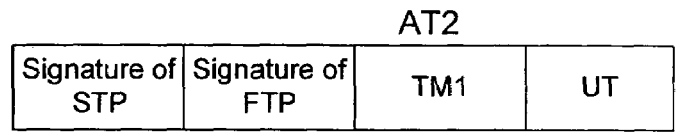
FIG. 14 shows an authentication token returned by the second-tier program to the first-tier program when mutual authentication between the first-tier and second-tier programs is required.
Figure 15:
FIG. 15 shows an authentication token constructed by the second-tier program to authenticate to a third-tier program.
Figure 16:
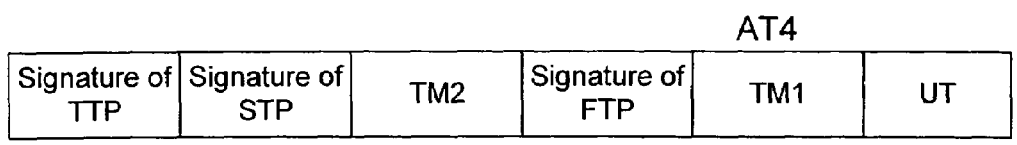
FIG. 16 shows an authentication token returned by the third-tier program to the second-tier program when mutual authentication between the second-tier and third-tier programs is required.

Referring now to FIG. 13, a sample authentication token AT1 used to authenticate a first-tier program to a second-tier program is shown, which includes the user token UT, token manifest TM1, and signature of the first-tier program (FTP). This authentication token AT1 corresponds to the AT1 shown in FIG. 7 and discussed above. Thus, AT1 created in step 730 of FIG. 7 is shown in FIG. 13. If mutual authentication is required, the second-tier program signs AT1 using its own private key that was dynamically-generated by the dynamic key generation mechanism, and thus generates AT2 shown in FIG. 14 (as described in step 770 of FIG. 7). If the second-tier program needs to authenticate to a third-tier program, the second-tier program STP starts with the authentication token AT1 received from the first-tier program, prepends a token manifest TM2, and digitally signs the result to create a new authentication token AT3 shown in FIG. 15. The creation of AT3 is discussed in step 810 of FIG. 8. If mutual authentication between the second-tier program STP and the third-tier program TTP is required, the third-tier program digitally signs AT3 received from the second-tier program using its private key that was dynamically generated by the public key authority, resulting in a new authentication token AT4 in FIG. 16 that is passed back to the second-tier program in step 850 of FIG. 8. If the third-tier program needs to authenticate to a fourth-tier program, it generates a new authentication token by adding a new token manifest TM3 to the AT3 received from the second-tier program, and by signing this using its private key that was dynamically generated by the public key authority, resulting in a new authentication token AT5 in FIG. 17 that may be sent to the fourth-tier program. This process can continue for any suitable number of tiers. Thus, as shown in FIG. 18, an Nth-tier program can create an authentication token ATN for authenticating with an (N+1)th-tier program by adding a new token manifest TMN and signing this using its private key that was dynamically generated. The authentication token for each tier is generated from the authentication token received from the previous tier, resulting in an authentication token that includes information from all tiers between the user and the end-tier. As a result, each authentication token inherently contains the entire transaction between the end user and the last-tier program, so this information may be written to a log file (e.g., 127 in FIG. 1).

Method 1000 in FIG. 10 refers to a step of dynamically authenticating with the public key authority to verify a received authentication token in step 1010. The authentication token AT3 in FIG. 15 was generated by the second-tier program for authentication with a third-tier program. This same authentication token AT3 could be used to authenticate to the public key authority. Once the public key authority verifies AT3, it creates a new authentication token AT3' shown in FIG. 19 by signing AT3 using its own private key. The second-tier program may then verify that AT3' is valid. In similar fashion, the authentication token AT5 in FIG. 17 that was created by the third-tier program could be used to authenticate with the public key authority in the same manner. In this example, the public key authority would sign AT5 to generate therefrom AT5' shown in FIG. 20. The third-tier program could then determine whether the authentication token AT5' is valid or not. In the most preferred implementation, only the end-tier program authenticates to the public key authority to avoid the run-time overhead of having each tier individually authenticate to the public key authority. Because the authentication token contains information for each of the levels between the user and the end-tier program, the end-tier program can query the public key authority for the sender's public key to verify that all of the information in the authentication token is valid.

Figure 21:
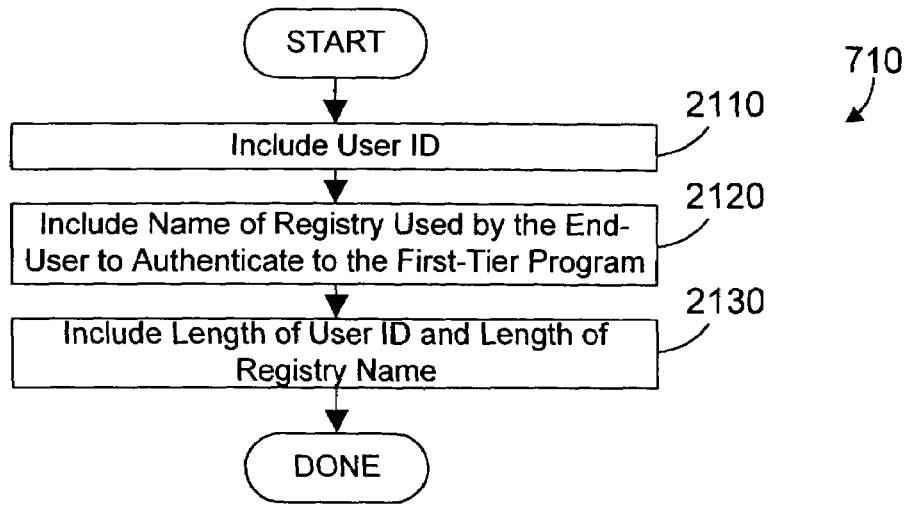
FIG. 21 is a method showing one particular implementation within the scope of the preferred embodiments for step 710 in FIG. 7.
Figure 22:
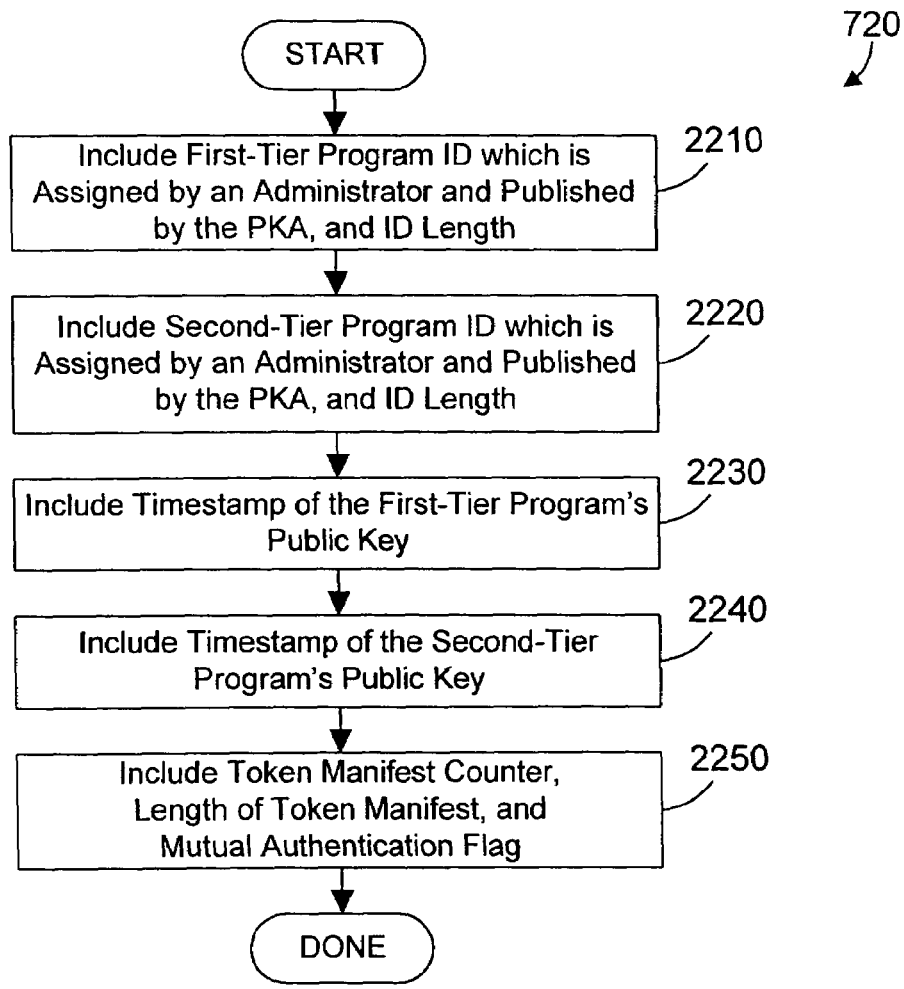
FIG. 22 is a method showing one particular implementation within the scope of the preferred embodiments for step 720 in FIG. 7.

Referring back to FIG. 7, step 710 builds a user token UT. One possible implementation for step 710 in FIG. 7 is shown in FIG. 21, which generates the user token UT shown in FIG. 12. The user ID is included (step 2110), the name of the registry used by the end-user to authenticate to the first-tier program is included (step 2120), and the length of the user ID and length of the registry name are included (step 2130). In similar fashion, FIG. 22 shows one possible implementation for step 720 in FIG. 7 that generates the token manifest TM shown in FIG. 12. An identifier for the first-tier program is included, along with the length of the identifier (step 2210). In similar fashion, an identifier and length for the second-tier program is included (step 2220). A timestamp of the first-tier program's public key is included (step 2230), along with the timestamp of the second-tier program's public key (step 2240). A token manifest counter, length of the token manifest, and mutual authentication flag are then included (step 2250). The timestamp of the keys in step 2230 and 2240 determine whether the key pairs that are dynamically-generated by the dynamic key generation mechanism are still valid. The preferred embodiments expressly extend to any suitable duration for the dynamically-generated public/private key pairs, from a fraction of a second to years. However, in the most preferred implementation, dynamically-generated public/private key pairs are only valid for a period of minutes, possibly hours. By forcing the dynamic key generation mechanism to dynamically generate new keys when the old ones expire, the result is a system that has keys that change so often that they would be of very limited use if obtained by a hacker.

Figure 23:
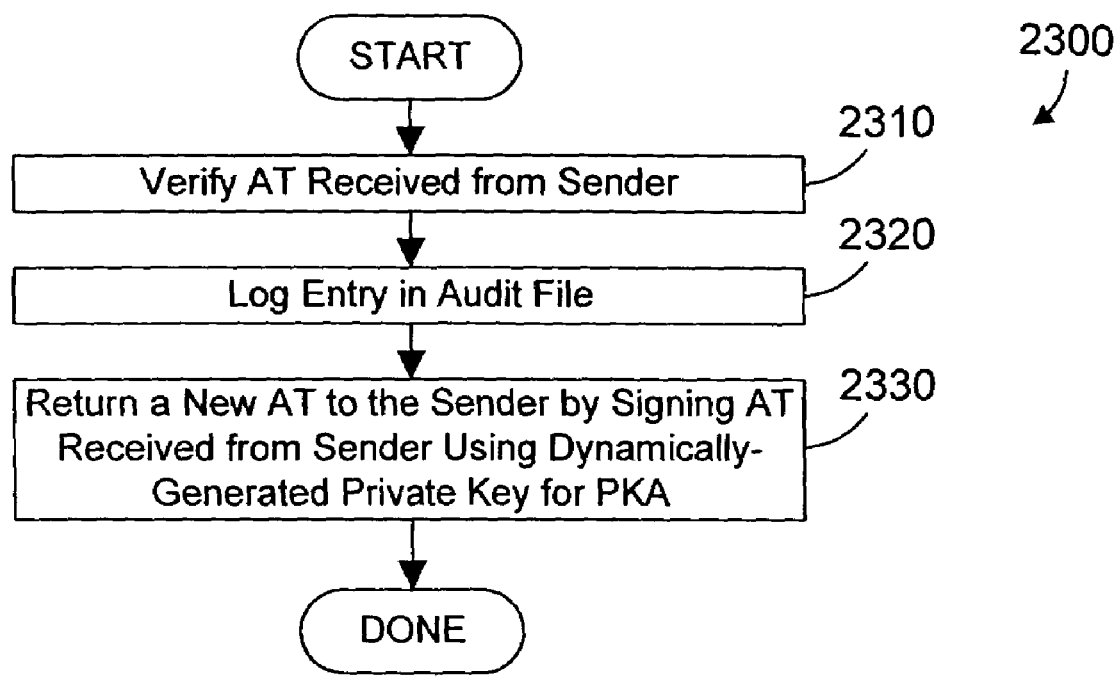
FIG. 23 is a method performed by the public key authority within the scope of the preferred embodiments.

One significant aspect to the preferred embodiments is the nesting of information in an authentication token by using an authentication token received from a previous-tier program in generating an authentication token for the next-tier program. The result is an authentication token that contains information relating to all programs between the user and the current tier. This allows a log file to be kept that is written to each time a program verifies an authentication token. This log file 127 is shown in FIG. 1. As stated above, an authentication token passed to the public key authority for verification (such as AT3 in FIG. 15 or AT 5 in FIG. 17) contains a chain of information that indicates the path that was taken to reach the program that is verifying the authentication token. As a result, it is possible to use the data in the log file to determine performance bottlenecks in the system, to debug problems between programs, and to provide forensic evidence when an unauthorized user or program is detected. Referring to FIG. 23, a method 2300 is preferably performed by the public key authority during the step of dynamic authentication to the public key authority in step 1010 of FIG. 10. First, the authentication token received from the sender is verified (step 2310) by assuring the sender and the program that signed the authentication token are the same. One or more entries are then written to the log file to represent the information in the authentication token (step 2320). The public key authority then generates a new authentication token by signing the received authentication token using the public key authority's private key, and returns the new authentication token (step 2330). Note that the public key authority need not necessarily send the entire authentication token, but could instead simply return the digital signature over the authentication token. By verifying the public key authority, method 2300 prevents man-in-the-middle attacks by verifying the public key authority signed the authentication token.

The present invention allows programs on multiple levels to authenticate with each other using dynamically-generated public/private key pairs. One aspect of the present invention is the ability for a program at one tier to assert the identity of the end user to the next tier. Thus, if a request is made by the user that requires a first-tier program to authenticate to a second-tier program, which must then authenticate to a third-tier program, etc., at each level the identity of the end user is asserted to the program to allow the program to determine whether the user has the required access to obtain the requested service. By nesting the authentication token information for the next tier, a program at any tier has access to all information embedded in the authentication token that relates to other tiers. In addition, the ability to log which programs access other programs allows advanced analysis that may help identify performance improvements, that allow advanced debugging, and that allow forensic analysis if an intrusion by a user or a program is detected.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, the discussion of the prior art with respect to method 400 of FIG. 4 shows issues that arise when storing user IDs and passwords in a central location. Note, however, that the user IDs (without passwords) could be stored in a central location, while authentication is performed using the dynamically generated public/private key pairs of the preferred embodiments. These and other variations are within the scope of the preferred embodiments disclosed herein.

What is claimed is:

1. An apparatus comprising:
   at least one processor;
   a memory coupled to the at least one processor;
   a first program residing in the memory;
   a second program residing in the memory;
   a third program residing in the memory;
   a dynamic key generation mechanism that dynamically generates public/private key pairs; and
   an inter-program authentication mechanism that authenticates the first program to the second program using a first authentication token that is digitally signed by the first program using a private key that is dynamically generated by the dynamic key generation mechanism, that authenticates the second program to the first program, if required, by digitally signing the first authentication token using a private key corresponding to the second program to generate therefrom a second authentication token, and returning the second authentication token to the first program, and that authenticates the second program to the third program by generating a third authentication token from the first authentication token received from the first program, and sending the third authentication token to the third program.

2. The apparatus of claim 1 wherein the first program includes an authentication mechanism that authenticates a user.

3. The apparatus of claim 1 wherein, after the inter-program authentication mechanism authenticates the first program to the second program, the second program performs identity mapping from an identity asserted by the first program to an identity understood by the second program.

4. The apparatus of claim 1 wherein the first authentication token comprises:
   information about a user that authenticates with the first program;
   information about the first program;
   information about the second program; and
   a digital signature of the first program using a private key for the first program generated by the dynamic key generation mechanism.

5. The apparatus of claim 1 wherein the second program verifies the first authentication token by querying a public key authority for the public key corresponding to the first program.

6. The apparatus of claim 5 wherein the second program verifies the first authentication token by verifying the digital signature of the first program using the public key for the first program retrieved from the public key authority.

7. The apparatus of claim 1 wherein the third program verifies the third authentication token by querying a public key authority for the public key corresponding to the second program.

8. The apparatus of claim 1 farther comprising log file that is written to each time a program verifies an authentication token.

9. An apparatus comprising:
   at least one processor;
   a memory coupled to the at least one processor;
   a first program residing in the memory, the first program including an authentication mechanism that authenticates a user;
   a second program residing in the memory;
   a dynamic key generation mechanism that dynamically generates public/private keypairs;
   a public key authority that publishes public keys generated by the dynamic key generation mechanism; and
   an inter-program authentication mechanism that authenticates the first program to the second program using a first authentication token that is digitally signed by the first program using a private key that is dynamically generated by the dynamic key generation mechanism and that authenticates the second program to the first program, if required, by digitally signing the first authentication token using a private key corresponding to the second program to generate therefrom a second authentication token, and returning the second authentication token to the first program.

10. The apparatus of claim 9 wherein, after the inter-program authentication mechanism authenticates the first program to the second program, the second program performs identity mapping from an identity asserted by the first program to an identity understood by the second program.

11. The apparatus of claim 9 wherein the first authentication token comprises:
   information about a user that authenticates with the first program;
   information about the first program;
   information about the second program; and
   a digital signature of the first program using a private key for the first program generated by the dynamic key generation mechanism.

12. The apparatus of claim 9 wherein the second program verifies the first authentication token by querying the public key authority for the public key corresponding to the first program.

13. The apparatus of claim 12 wherein the second program verifies the first authentication token by verifying the digital signature of the first program using the public key for the first program retrieved from the public key authority.

14. The apparatus of claim 9 wherein the second program authenticates to the first program, if required, by digitally signing the first authentication token using a private key corresponding to the second program to generate therefrom a second authentication token, and returning the second authentication token to the first program.

15. The apparatus of claim 9 wherein the third program verifies the third authentication token by querying the public key authority for the public key corresponding to the second program.

16. The apparatus of claim 9 further comprising a log file that is written to each time a program verifies an authentication token.

17. An apparatus comprising:
    at least one processor;
    a memory coupled to the at least one processor;
    a first program residing in the memory;
    a second program residing in the memory;
    a third program residing in the memory;
    a dynamic key generation mechanism that dynamically generates public/private key pairs; and
    an inter-program authentication mechanism that authenticates the first program to the second program using a first authentication token generated by the first program using a public/private key pair corresponding to the first program, and that authenticates the second program to the third program using a second authentication token that includes all information in the first authentication token.

18. A method for a first program to authenticate to a second program, the method comprising the steps of:
    (A) dynamically generating a public/private key pair for the first program;
    (B) the first program generating a first authentication token using the private key dynamically generated in step (A); and
    (C) the second program verifying the first authentication token using the public key dynamically generated in step (A).

19. The method of claim 18 wherein the second program verifies the first authentication token in step (C) by verifying a digital signature of the first program in the authentication token using the public key for the first program.

20. The method of claim 18 further comprising the step of authenticating a user to the first program.

21. The method of claim 18 further comprising the step of performing identity mapping from an identity asserted by the first program to an identity understood by the second program.

22. The method of claim 18 wherein the first authentication token comprises:
    information about a user that authenticates with the first program;
    information about the first program;
    information about the second program; and
    a digital signature of the first program using a private key for the first program generated by the dynamic key generation mechanism.

23. The method of claim 18 further comprising the steps of:
    (D) dynamically generating a public/private key pair for the second program;
    (E) the second program digitally signing the first authentication token using the private key generated in step (D) to generate therefrom a second authentication token; and
    (F) returning the second authentication token to the first program to authenticate the second program to the first program.

24. The method of claim 18 further comprising the step of the second program authenticating to a third program by generating a third authentication token from the first authentication token and sending the third authentication token to the third program.

25. The method of claim 24 further comprising the step of the third program verifying the third authentication token by using the public key generated in step (D).

26. The method of claim 18 further comprising the step of writing to a log file that is written to each time a program verifies an authentication token.

27. A method for a first program to authenticate to a second program, the method comprising the steps of:
    (A) dynamically generating a public/private key pair for the first program;
    (B) sending the public key for the first program to a public key authority;
    (C) dynamically generating a public/private key pair for the second program;
    (D) sending the public key for the second program to the public key authority;
    (E) the first program generating a first authentication token using the private key for the first program; and
    (F) the second program verifying the first authentication token by querying the public key authority for the public key corresponding to the first program.

28. The method of claim 27 wherein the second program verifies the first authentication token in step (F) by verifying a digital signature of the first program in the authentication token using the public key for the first program retrieved from the public key authority.

29. The method of claim 27 further comprising the step of authenticating a user to the first program.

30. The method of claim 27 further comprising the step of performing identity mapping from an identity asserted by the first program to an identity understood by the second program.

31. The method of claim 27 wherein the first authentication token comprises:
    information about a user that authenticates with the first program;
    information about the first program;
    information about the second program; and
    a digital signature of the first program using a private key for the first program generated by the dynamic key generation mechanism.

32. The method of claim 27 further comprising the steps of:
    (G) dynamically generating a public/private key pair for the second program;
    (H) the second program digitally signing the first authentication token using the private key generated in step (G) to generate therefrom a second authentication token; and
    (I) returning the second authentication token to the first program to authenticate the second program to the first program.

33. The method of claim 27 further comprising the step of the second program authenticating to a third program by generating a third authentication token from the first authentication token and sending the third authentication token to the third program.

34. The method of claim 33 further comprising the step of the third program verifying the third authentication token by using the public key corresponding to the second program.

35. The method of claim 27 further comprising the step of writing to a log file that is written to each time a program verifies an authentication token.

36. A method for authenticating a first program to a third program, the method comprising the steps of:
   authenticating the first program to a second program using a first authentication token generated by the first program using a public/private key pair corresponding to the first program; and
   authenticating the second program to the third program using a second authentication token that includes all information in the first authentication token.

37. A computer-readable program product comprising:
   (A) an inter-program authentication mechanism that authenticates a first program to a second program using a public/private key pair that is dynamically generated by a dynamic key generation mechanism; and
   (B) recordable media bearing the inter-program authentication mechanism.

38. The program product of claim 37 wherein the first program includes an authentication mechanism that authenticates a user.

39. The program product of claim 37 wherein, after the inter-program authentication mechanism authenticates the first program to the second program, the second program performs identity mapping from an identity asserted by the first program to an identity understood by the second program.

40. The program product of claim 37 wherein the first program authenticates to the second program using a first authentication token that is digitally signed by the first program using a key that is dynamically generated by the dynamic key generation mechanism.

41. The program product of claim 40 wherein the first authentication token comprises:
   information about a user that authenticates with the first program;
   information about the first program;
   information about the second program; and
   a digital signature of the first program using a private key for the first program generated by the dynamic key generation mechanism.

42. The program product of claim 40 wherein the second program verifies the first authentication token by querying the public key authority for the public key corresponding to the first program.

43. The program product of claim 42 wherein the second program verifies the first authentication token by verifying the digital signature of the first program using the public key for the first program retrieved from the public key authority.

44. The program product of claim 40 wherein the second program authenticates to the first program, if required, by digitally signing the first authentication token using a private key corresponding to the second program to generate therefrom a second authentication token, and returning the second authentication token to the first program.

45. The program product of claim 44 further comprising a third program, wherein the second program authenticates to the third program by generating a third authentication token from the first authentication token received from the first program, and sending the third authentication token to the third program.

46. The program product of claim 45 wherein the third program verifies the third authentication token by querying the public key authority for the public key corresponding to the second program.

47. The program product of claim 37 further comprising log file that is written to each time a program verifies an authentication token.

48. A computer-readable program product comprising:
   (A) an inter-program authentication mechanism that authenticates a first program to a second program using a first authentication token that is digitally signed by the first program using a key that is dynamically generated by a dynamic key generation mechanism in a public key authority, the first program including an authentication mechanism that authenticates a user; and
   (B) recordable media bearing the inter-program authentication mechanism.

49. The program product of claim 48 wherein, after the inter-program authentication mechanism authenticates the first program to the second program, the second program performs identity mapping from an identity asserted by the first program to an identity understood by the second program.

50. The program product of claim 48 wherein the first authentication token comprises:
   information about a user that authenticates with the first program;
   information about the first program;
   information about the second program; and
   a digital signature of the first program using a private key for the first program generated by the dynamic key generation mechanism.

51. The program product of claim 48 wherein the second program verifies the first authentication token by querying the public key authority for the public key corresponding to the first program.

52. The program product of claim 51 wherein the second program verifies the first authentication token by verifying the digital signature of the first program using the public key for the first program retrieved from the public key authority.

53. The program product of claim 48 wherein the second program authenticates to the first program, if required, by digitally signing the first authentication token using a private key corresponding to the second program to generate therefrom a second authentication token, and returning the second authentication token to the first program.

54. The program product of claim 53 further comprising a third program, wherein the second program authenticates to the third program by generating a third authentication token from the first authentication token received from the first program, and sending the third authentication token to the third program.

55. The program product of claim 53 wherein the third program verifies the third authentication token by querying the public key authority for the public key corresponding to the second program.

56. The program product of claim 48 further comprising a log file that is written to each time a program verifies an authentication token.

57. A computer-readable program product comprising:
   (A) an inter-program authentication mechanism that authenticates a first program to a second program using a first authentication token generated by the first program using a public/private key pair corresponding to the first program, and that authenticates the second program to a third program using a second authentication token that includes all information in the first authentication token; and
   (B) recordable media bearing the inter-program authentication mechanism.

* * * * *